April 4, 1967 R. G. BEST ETAL 3,312,298
AUTOMATIC DUAL RANGE WEIGHING SCALE
Filed May 27, 1966 2 Sheets-Sheet 2
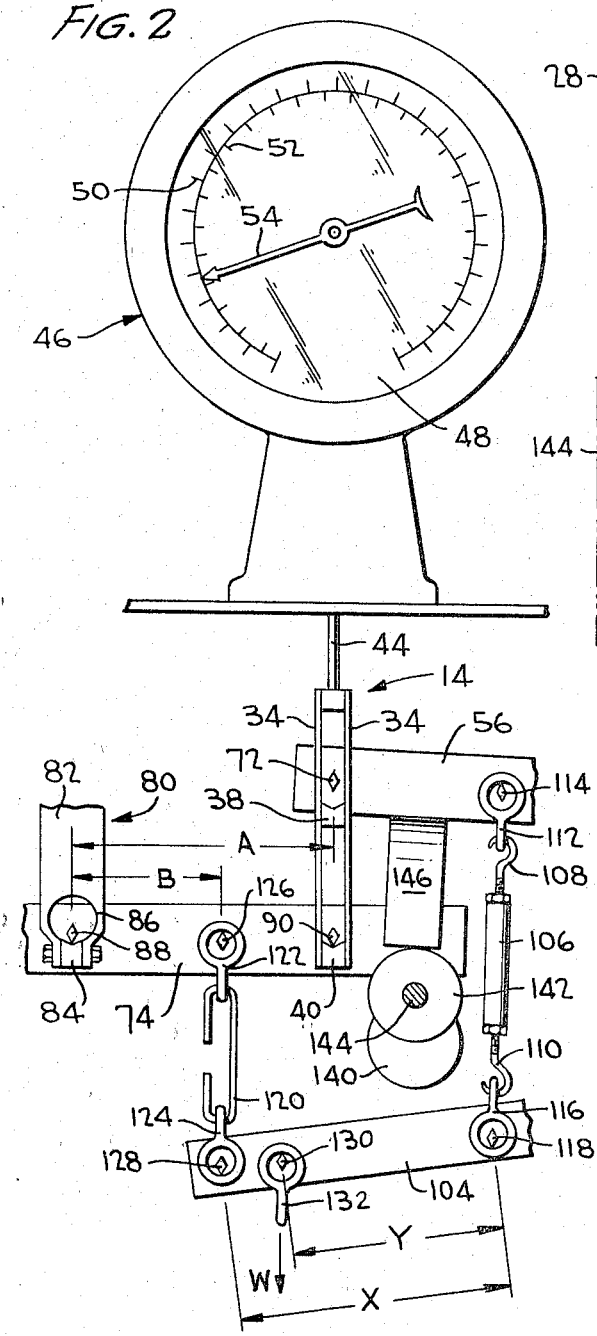
INVENTORS,
ROBERT G. BEST
GEORGE H. HARTZELL
JOHN W. ZSULEVICH
BY Jacobi & Davidson
ATTORNEYS

United States Patent Office 3,312,298
Patented Apr. 4, 1967

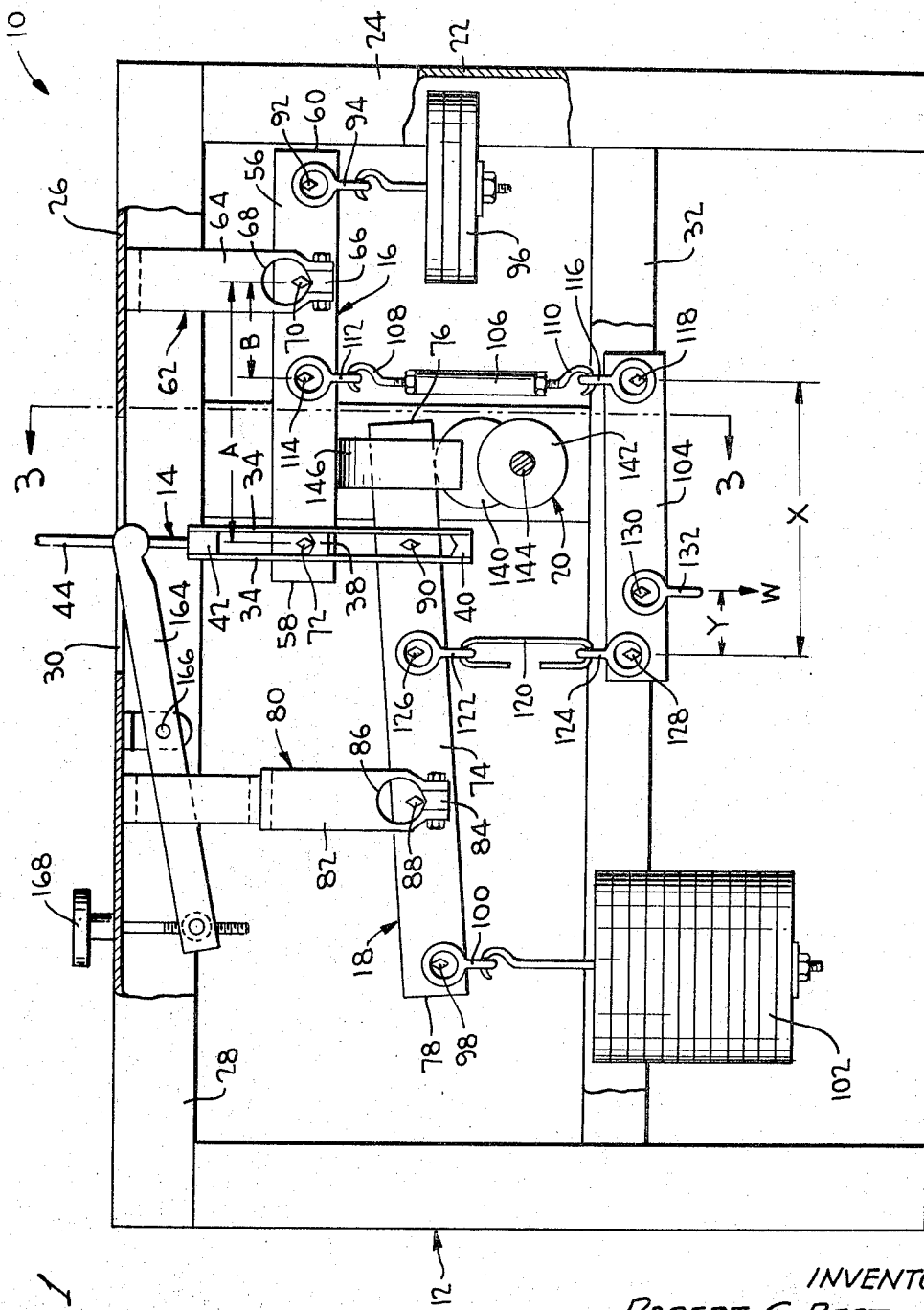

3,312,298
AUTOMATIC DUAL RANGE WEIGHING SCALE
Robert G. Best, George H. Hartzell, and John W. Zsulevich, Columbus, Ohio, assignors to Thurman Scale Company, a division of Thurman Manufacturing Company, a corporation of Ohio
Filed May 27, 1966, Ser. No. 553,530
12 Claims. (Cl. 177—158)

This invention relates to the art of weighing scales and more particularly it relates to the provision of a weighing scale incorporating a changeable lever ratio which thereby permits at least two ranges of scale operation.

Weighing scale devices are commonly used in connection with automatic weighing control units, such as aggregate or cement batch plants where large quantities of ingredients to be mixed together are weighed before or during the mixing operation. In plants of this type, it is quite common to encounter large variations in the batch sizes to be weighed. For example, a concrete batch plant might, in one run, be required to weigh ingredients for eight to ten yards of concrete, and in the next run, to weigh ingredients for one to two yards of concrete. If the same standard form of weighing scale were used to weigh each of these different batches, at least one of the weighing operations would be outside the desired tolerance limits normally required for batching operations.

For example, a ten yard batch of concrete would require approximately 5200 lbs. of cement and would have to be weighed on a weighing scale of approximately 6000 lbs. capacity. The usual batching tolerances are plus or minus 1% of batch weight, and hence for a ten yard batch, the tolerances would be plus or minus 52 lbs. However, if one yard batch of concrete were weighed, the tolerances would be plus or minus 1% of 520 lbs. or, in other words, plus or minus 5.2 lbs. Since the normal commercial weighing scale is accurate within 0.1%, the accuracy tolerances for the aforementioned 6000 lb. weighing scale would be plus or minus 6 lbs. Hence, the accuracy limits of a 6000 lb. scale would not be satisfactory for accurate measurement of a one yard batch of concrete. Moreover, in addition to the scale error itself, other possible error factors must be taken into account in a commercial batching operation, such as feeder response, control inaccuracies and so on.

Hence, from the foregoing, it can be seen that an ordinary weighing scale cannot provide the proper degree of accuracy for handling both large and small batches to be weighed. While this problem was recognized to some degree in the prior art, the only practical solution offered by the prior art was to provide two separate weighing scales, one for high range weighing and one for low range weighing. Of course, the difficulty with such an approach was, first of all, the expense involved since two separate scales had to be purchased and maintained. Also, each of the scales had to be separately coupled with the automatic weighing controls, thereby considerably complicating the nature of such controls. Finally, it was necessary to make some change in the feeding means to selectively feed the material to be weighed to either one or the other of the weighing scales. Additionally, if only one small batch were to be weighed between two large batches, the operator would often disregard the changeover to the low range scale, and would merely weigh the small batch on the high range scale. Of course, as aforementioned, the tolerances of the small batch weighed on the high range scale would be improper.

With the foregoing matter in mind, it is, therefore, an object of the present invention to overcome the problems previously encountered in the art, and the difficulties and deficiencies associated with prior art attempts to overcome these problems, and to provide in their stead, an improved weighing scale means capable of accurately and efficiently accomplishing both high range weighing and low range weighing.

Another object of the present invention is to provide a dual range scale device incorporating a changeable weighing ratio which permits accurate weighing of heavy loads and, with a change in ratio, permits similarly accurate weighing of small loads.

Another object of the present invention is to provide a unitary scale mechanism incorporating a pair of weighing lever systems therewithin, one of said lever systems being operative while the other of said weighing lever systems is rendered inoperative, and vice versa.

Another object of the present invention is to provide a dual range scale which automatically can be converted from one range to the other range.

Another object of the present invention is to provide a dual range weighing scale having a single weight indicator and a pair of separately operable weighing lever systems synchronized with the weight indicator whereby, through selection of one or the other of the weighing lever systems, either a high weighing range or a low weighing range will be measured by the weight indicator.

Another object of the present invention is to provide a weighing scale means having variable weighing lever systems therewithin to thereby provide a unit which can produce any desired multiple between low range and high range operation.

Further objects of the present invention include the provision of an automatic dual range weighing scale means, which is relatively simple in design and hence relatively inexpensive to produce, is rugged and durable in construction, provides a small compact unit which can be readily transported and installed, can be simply and easily operated by any normally skilled operator, and provides accurate and efficient high and low range weighing for extended durations of time, without the need for repeated maintenance.

Other objects, advantages and salient features of the present invention will become apparent from the following detailed description, which, taken in conjunction with the annexed drawings, discloses a preferred embodiment thereof.

Briefly stated, the foregoing objects are attained by providing a weighing scale means having a first and second weighing lever means therewithin. Each of these weighing lever means is coupled with a load supporting means, capable of supporting a load to be weighed. The scale further includes a movement responsive means coupled to the weight indicator and engageable by both the first and the second weighing lever means. A cam means is provided for selective engagement with either one or the other of the weighing lever means, thereby permitting such lever means to operate independently of each other. For example, when the cam means engages the first weighing lever means, it prevents the same from engaging the movement responsive means, and hence, that portion of the load being weighed which is applied to the second weighing lever means is transmitted to the movement responsive means to cause a reading and hence to define a first range of operation of the scale. Alternatively, if the cam means engages the second weighing lever means, thereby preventing such second weighing lever means from engaging the movement responsive means, that portion of the load being weighed which is transmitted to the first weighing lever means becomes applied to the movement responsive means, thereby giving a reading which defines a second range of operation of the scale. Automatic means are provided for regulating the position of the cam means, and it will be appreciated that the cam means serves the dual function of locking one range out of operation, while simultaneously permitting the other range to operate. By properly varying the first and second weighing lever means, the ratio between high range and low range operation can be varied as desired.

Referring to the drawings:

FIGURE 1 is a side elevational view, partly in section, of an automatic dual range weighing scale means in accordance with the principles of the present invention, such scale means being shown in one range of operation;

FIGURE 2 is a fragmentary side elevational view of a portion of the scale means of the present invention, showing the same in the other range of operation;

FIGURE 3 is a sectional view taken substantially along the lines 3—3 of FIGURE 1; and FIGURE 4 is a fragmentary elevational view looking in the direction of the arrows 4—4 of FIGURE 3.

Referring now to the drawings, and particularly FIGURE 1 thereof, the dual range weighing scale means in accordance with the principles of the present invention is generally designated 10. Such scale means includes a support means generally designated 12, a movement responsive means generally designated 14, a first weighing lever means generally designated 16, a second weighing lever means generally designated 18, and a movable cam means generally designated 20.

The support means 12 includes a pair of spaced parallel end wall members 22, each of which has an inturned flange 24 at the opposite edges thereof. A top plate or cover 26 extends between the end walls 22, such top cover having downwardly directed flanges 28 at the forward and rearward edges thereof. A central opening 30 is provided in the top wall 26, for purposes to be presently described. The support means further includes a pair of angle irons 32 extending between the side walls at the forward and rear edges thereof, such angle irons being spaced between the ground and the top plate 26, as best shown in FIGURES 1 and 3. If desired, the entire support means 12 can be enclosed by mounting a plate which extends between the end walls 22 and connects to the flanges 24 and 28.

The movement responsive means 14 effectively forms a double loop member created by a pair of spaced apart plates 34, 34, each of which has an elongated opening 36 extending centrally therethrough. An upper set of V-bearings 38 is mounted between the plates 34, 34 and a lower set of V-bearings 40 is similarly mounted. These V-bearings 38 and 40 are mounted on opposite sides of the central opening 36, thereby permitting the first and second weighing lever means to traverse through the opening 36, while at the same time, permitting a contact means or projection from such weighing levers to engage against the V-bearings, in a manner to be more fully described hereinafter. An upper end means 42 at the top of the plates 36 serves to mount an elongated rod or steel-yard 44 which extends up to the dial head mechanism, as generally designated 46 in FIGURE 2. The dial head mechanism includes a dial face 48 carrying a first and second calibrated set of graduations, respectively designated 50 and 52. A conventional indicating pointer 54 is movable along the graduations 50 and 52 in response to a downward pull on the steel-yard 44, and hence it may be stated that the indication given on the dial head 46 is responsive to movement of the means 14.

The first weighing lever means is formed by an elongated flat lever 56 having what is nominally defined as an inboard end 58 and an outboard end 60. The lever 56 is supported from the support means 12 by the provision of a fulcrum means generally designated 62. The fulcrum means 62 is formed by an elongated bracket 64 fixed to the interior of the top wall 26 and extending downwardly on opposite sides of the first weighing lever 56. A V-bearing 66 is carried at the bottom of each side of the bracket 64 and an opening 68 is formed in each side of the bracket above the V-bearing 66. A knife edge pivot 70 is fixed to the lever 56 and extends from the opposite sides thereof through the openings 68 in the legs of the bracket 64. Hence, the bottom knife edge of this pivot 70 rests upon the V-bearings 66, thus serving to provide a fulcrum for movement of the weighing lever 56.

Another knife edge pivot element 72 extends from the inboard end portion of the lever 56 and into the spaces between the plates 34, 34 of the movement responsive means 14. Hence, such knife edge element 72 is movable within a certain zone of travel, the lower limit of which is defined by the set of V-bearings 38. When the knife edge at the bottom of the element 72 abuts against the V-bearings 38 in the manner shown in FIGURE 1, any further downward movement of the weighing lever 56 will cause a downward movement of the movement responsive means 14, thereby giving a reading on the dial head 46.

The second weighing lever means 18 includes an elongated lever 74, similar to the lever 56, with the lever 74 having what can nominally be defined as an inboard end 76 and an outboard end 78. The lever 74 is supported from the support means 12 by a fulcrum means generally designated 80, such fulcrum means being similar to the fulcrum means 62. That is, the fulcrum means 80 includes a bracket 82 fixed at its upper end to the top plate 26 and having its lower end extending on opposite sides of the lever 74 to support a pair of V-bearings 84. Above each V-bearing 84, an opening 86 is provided and a knife edge pivot element 88 extends from opposite sides of the lever 74 through the opening 86 to rest upon the V-bearings 84, thereby serving as a fulcrum point for the second weighing lever. A knife edge element 90 extends from the inboard end portion of the lever 74 through the openings between the plates 34, 34, and is adapted to abut against the lower V-bearings set 40 in the manner shown in FIGURE 2.

Thus, it will be appreciated that the elements 72 and 90 are similar in construction and disposition and serve a similar purpose, namely, abutment against an associated set of V-bearings on the movement responsive means 14. As aforesaid, when the element 72 abuts against the V-bearings 38, it effects a downward movement or pull on the movement responsive means 14. Similarly, when the element 90 abuts against the V-bearings 40, it likewise effects a downward movement on the movement responsive means 14.

For purposes of clarification, the term inboard end "portion" as used herein, is not limited to the precise inboard ends 58 and 76 respectively of the weighing levers 56 and 74. Instead, this term refers to that portion or section of a weighing lever which is adjacent its inboard end. Thus, although the element 72 is displaced from the actual inboard end 58 of the weighing lever 56, it is nevertheless considered to be mounted along the inboard end "portion." Similarly, although the element 90 is displaced from the actual inboard end 76 of the weighing lever 74, it is nevertheless considered to be mounted along the inboard end "portion" thereof.

At the outboard end portion of the first weighing lever 56, a further knife edge pivot element 92 is provided for supporting a U-shaped loop or clamp 94 which in turn supports a counterweight or counterbalance means 96. When the scale means 10 is initially assembled, the particular weight of the counterbalance means is so selected as to create a zero pull on the movement responsive means 14 when the element 72 abuts against the V-bearings 38 under a no-load condition. Similarly, along the outboard end portion of the second weighing lever 74, a knife edge element 98 is provided to support a U-shaped loop connector 100, which in turn supports a second counterweight or counterbalance means 102. Again, the weight of the counterbalance means is selected during initial assembly of the scale means to assure that under no-load conditions, zero pull will be encountered on the movement responsive means 14 when the element 90 abuts against the V-bearing set 40.

Means must be provided for supporting a load from the weighing lever means within the scale means 10, and for this purpose, a load supporting beam 104 is provided. Connector means couple one end of the beam 104 to the first weighing lever means 16 and the opposite end of the beam 104 to the second weighing lever means 18. The first connector means, for connecting one end of the beam means to the first weighing lever means 16, includes a turnbuckle assembly 106 having hooks 108 and 110 respectively mounted at the upper and lower ends thereof. The upper hook 108 connects to a U-shaped clamp 112 supported by a knife edge element 114 extending from the first weighing lever 56 between its inboard end and its fulcrum point. The lower hook 110 connects to a similar U-shaped clamp 116 supported by a knife edge element 118 extending from one end portion of the beam 104.

The second connector means for connecting the beam means 104 with the second weighing lever 74 includes a C-shaped clamp 120 which fits respectively through an upper and a lower U-shaped clamp 122 and 124. The upper C-shaped clamp 122 is supported by a knife edge element 126 extending from the second weighing lever 74 between its inboard end and its fulcrum point. The lower clamp 124 is supported by a knife edge element 128 extending from the end portion of the beam means 104 opposite to that carrying the element 118.

At some point along the beam means 104, between the knife edge elements 118 and 128, a further knife edge element 130 is provided. As shown in FIGURES 1 and 2, this element 130 is eccentrically arranged along the beam means in that it is located closer to one of the end connector elements than to the other. The element 130 serves to support a U-shaped clamp 132 which in turn supports the load to be weighed by the scale means 10. A designation W is used to indicate the downward pull which the load would exert on the clamp means 132 and hence on the beam means 104.

In order to permit the scale means 10 of the present invention to operate in its desired manner as a dual range scale, means must be provided for enabling one of the weighing lever systems to operate independently of the other of the weighing lever systems. More particularly, means must be provided to prevent one of the weighing lever systems from engaging the movement responsive means 14 while the other of the weighing lever systems is in engagement therewith. This function is accomplished by the cam means 20, and as can best be seen in FIGURE 3, such cam means includes a central lobe 140 disposed between a pair of outer lobes 142, 142. All of these cam lobes are fixed to a supporting shaft 144. The lobes 140 and 142 are effectively arranged 180° out of phase with each other, with the central lobe 140 being arranged for engagement with the second weighing lever 74 and the outer lobes 142 being arranged for engagement with the lower ends of a yoke 146 fixed and depending from the first weighting lever 56. In one range of operation of the scale means, as shown in FIGURES 1 and 3, the cam lobe 140 engages the second weighing lever 74 and essentially immobilizes the same, thereby preventing the knife edge 90 from contacting the V-bearing set 40 on the movement responsive means 14. Thus, in this range of operation, the only movement of the movement responsive means 14 will be through engagement of the first weighing lever knife edge element 72 with the V-bearing set 38. In the other range of operation of the scale means 10, as shown in FIGURE 2, the cam lobes 142 engage the yoke 146 to effectively immobilize the first weighing lever 56 and to prevent the element 72 from engaging the V-bearing set 38. Thus, in this range of operation, the only movement of the movement responsive means 14 will be effected by engagement of the second weighing lever knife edge element 90 with the lower V-bearing set 40.

Operation of the cam means 20 is effected through the use of a synchronous driving motor 148 coupled by means 150 with the cam shaft 144. The driving motor 148 is supported by a support plate 152 extending between the top of the support means and one of the central angle irons 32. The opposite angle iron 32 carries a short upstanding plate 154 through which the cam shaft 144 projects, and on this projecting cam shaft portion, a cam plate 156 is provided, such plate having a depression 158 along its periphery, as shown in FIGURE 4. Also mounted on the support plate 154 are a low limit switch and a high limit switch, said low limit switch being designated 160 and said high limit switch being designated 162. Each of these switches 160 and 162 has an actuating arm engageable with the periphery of the cam plate 156. Engagement of the actuating arm of a switch with the normal portion of the periphery of the cam plate 156 serves to close the switch, as is the case with the low limit switch 160 in FIGURE 4. However, when the switch actuating arm enters the depression 158 in the periphery of the cam plate 156, the switch is accordingly opened, as is the case with the high limit switch 162 in FIGURE 4. The driving motor 148 can be controlled by a control switch on the automatic weighing control panel and when the motor 148 is energized through such control switch, it will serve to rotate the entire cam assembly and the cam plate 156 through a 180° rotation. At the end of such a 180° rotation, the depression 158 will have moved from the position shown in FIGURE 4 to a position in alignment with the actuating arm of the low limit switch 160. Hence, at this time, the unit will have effectively shifted range.

To complete the description of the mechanism of the present invention, there is shown in FIGURE 1 a fork mechanism 164 pivotally mounted at 166 to a support depending from the top wall 26 of the support means. The inboard end of the fork 164 is engageable with the top wall 42 of the movement responsive means 14, while the outboard end of the fork 164 is coupled with the control knob 168. Operation of the knob 168 can manually engage the inner end of the fork 164 with the movement responsive means, thereby manually setting the dial head 46 to provide for an electrical check of the control assembly.

As was previously described, the scale means 10 of the present invention is capable of operation in two different modes or ranges, namely, a high range, as shown in FIGURES 1 and 3, and a low range, as shown in FIGURE 2. In each of these ranges, a weight W can be considered as forming the load which is applied to the clamp 132, and a fractional amount of this load will be transmitted through the operative weighing lever system to the dial head 46 to cause a reading thereupon.

In general, the scale means of the present invention produces an overall weighing ratio in accordance with the folowing formula:

$$AX/BY$$

where the parameters A, B, X and Y are measurements as specifically designated in FIGURES 1 and 2. In designating these parameters the knife edge elements 72 and 90 can be considered as contact means engageable with the movement responsive means 14, the knife edge elements 70 and 88 can be considered as defining the fulcrum points of the respective weighing levers, the knife edge elements 114 and 126 can be considered as defining the connection points along the weighing levers, the knife edge elements 118 and 128 can be considered as defining the connection points along the beam means 104, and the knife edge element 130 can be considered as defining the point of load attachment to the beam means 104.

Thus, to particularly define the parameters in the aforementioned formula, the parameter A is the distance from the fulcrum means to the contact means along the weighing lever means which is engaged with the movement responsive means. The parameter B can be considered as the distance from the fulcrum point to the connection point along the weighing lever means engaged with the movement responsive means. To elaborate slightly, in FIGURE 1, the first weighing lever means 16 is engaged with the movement responsive means 14, and hence, the parameter A is the distance along the lever 56 from the knife edge element 70 to the knife edge element 72. The distance B is the linear distance from the knife edge element 70 to the knife edge element 114. Alternatively, in FIGURE 2, it is the second weighing lever 74 which is engaged with the movement responsive means 14. Hence, the distance A is the linear distance along the lever 74 from the knife edge element 88 to the knife edge element 90. This distance B is the linear distance along the lever 74 from the knife edge element 88 to the knife edge element 126.

Continuing with the definition of the parameters in the above-mentioned formula, the designation X is the distance along the beam means between the spaced connectors, and hence, regardless of the position of the weighing lever means, the parameter X will always represent the linear distance along the beam means 104 between the knife edge elements 118 and 128. Finally, the parameter Y is the linear distance along the beam means from the load attachment point to the connector means which is coupled to the weighing lever means which is immobilized by the cam means 20. Thus, in FIGURE 1, since the second weighing lever 74 is immobilized by the cam means 20, the distance Y is the distance from the knife edge element 130 to the knife edge element 128. In FIGURE 2, it is the weighing lever 56 which is immobilized by the cam means, and accordingly, the distance Y is the linear distance along the beam means 104 from the knife edge element 130 to the knife edge element 118.

With the foregoing explanation in mind, a specific example can be set forth to show the manner in which a 5:1 ratio of high to low range can be obtained. In such example, the distance A along both weighing levers can be 8 inches. The distance B along the first weighing lever 56 can be 3 inches, while the distance B along the second weighing lever 74 can be 4.5 inches. The distance X along the beam means 104 can be 8.5 inches and the load attachment knife edge element 130 can be displaced 1.961 inches from the connector element 128. Hence, in FIGURE 1, the value of Y will be 1.961, while in FIGURE 2, the value of Y will be 6.539.

Utilizing these values, and considering the high range of operation when the scale means is in the position shown in FIGURE 1, assume that a load W is applied to the clamp 132 and hence to the knife edge element 130. Since the connector element 128 is fixed or immobilized due to the action of the cam means 20, that portion of the load which is transmitted to the first connector element 118 is $Y:X$, or 1.961:8.5, or 1:4.333. This fractional load is, of course, transmitted directly through the connector 106 to the connection point 114 along the first weighing lever 56. Since the pivot 70 is fixed by the fulcrum means 62, that portion of the load upon the first weighing lever 56 which is transmitted to the movement responsive means 14 is represented by the ratio $B:A$, or 3:8 or 1:2.667. Hence, the overall high range ratio of the scale means 10 is represented by 2.667×4.333 which equals 11.555. This same overall high range ratio can be calculated merely by using the formula listed hereinabove and the value obtained through the use of this formula will again be 11.555.

Now, considering the low range of operation and re-referring to FIGURE 2, the pivot 118 is fixed and hence the fraction of the load transmitted to the element 128 is $Y:X$, or 6.538:8.5, or 1:1.3. This load is transmitted to the second weighing lever 74 which has a fixed pivot at the fulcrum point 88. Hence, the fractional amount transmitted along the second weighing lever 74 to the movement responsive means 14 is $B:A$, or 4.5:8, or 1:1.778. Hence, the overall low range ratio is equal to 1:3×1.778 which equals 2.311. This same low range ratio can be accomplished by merely inserting the values of the parameters of FIGURE 2 into the above-mentioned formula.

Thus, in accordance with the foregoing examples, the established high range overall ratio is 11.555, while the established low range overall ratio is 2.311. Hence, the total scale ratio, that is, the high to low range ratio, is 11.555:2.311 or 5:1. Accordingly, for example the dial face 48 of the scale can carry a high range of graduations 50 ranging from 0 to 30,000 pounds and can simultaneously carry a low set of graduations 52 ranging from 0 to 6,000 pounds. Using the standard commercial scale accuracy tolerances, namely, plus or minus 0.1%, the high range would be accurate within plus or minus 30 lbs., while the low range would be accurate within plus or minus 6 lbs. Hence, as the scale is being used in operation, the operator can simply and easily switch from the high range to the low range merely by actuating the driving motor 148 to change the position of the cam means 20.

After reading the foregoing detailed description, it should be apparent that the objects set forth at the outset of the specification have been successfully achieved by the present invention. Accordingly,

What is claimed is:

1. Automatic dual range weighing scale means comprising:

means responsive to movement for indicating the weight of a load being weighed;

first weighing lever means having spaced apart inboard and outboard end portions;

second weighing lever means having spaced apart inboard and outboard end portions;

said first and second weighing lever means having their inboard end portions disposed for engagement with said movement responsive means;

first and second fulcrum means respectively supporting said first and second weighing lever means between their respective inboard and outboard end portions coupling means for connecting said first and second weighing lever means with a load to be weighed; and, movable cam means selectively engageable with one of said weighing lever means, thereby leaving the other of said weighing lever means free for movement independent of said one weighing lever means;

said movable cam means, when engaged with said first weighing lever means, preventing said first weighing lever means inboard end portion from engaging said movement responsive means, whereupon that portion of the load being weighed which is transmitted to said second weighing lever means will cause said second weighing lever means inboard end portion to engage and move said movement responsive means, thereby defining a first range of operation of said scale means;

said movable cam means, when engaged with said second weighing lever means, preventing said second weighing lever means inboard end portion from engaging said movement responsive means, whereupon that portion of the load being weighed which is transmitted to said first weighing lever means will cause said first weighing lever means inboard end portion to engage and move said movement responsive means, thereby defining a second range of operation of said scale means.

2. Automatic dual range weighing scale means as defined in claim 1 wherein said cam means includes offset first and second cam portions, said first cam portion being engageable with said first weighing lever means as said second cam portion is out of engagement with said second weighing lever means, and said second cam portion being engageable with said second weighing lever means as said first cam portion is out of engagement with said first weighing lever means.

3. Automatic dual range scale means as defined in claim 2, wherein said one of said cam portions has a pair of spaced apart lobes and the other of said cam portions is a single lobe disposed between said spaced apart lobes, one of said weighing lever means having an attached yoke portion engageable with said spaced apart lobes.

4. Automatic dual range weighing scale means as defined in claim 1, further including driving motor means coupled with said cam means for moving said cam means to a position defining a selected range of operation of said cam means.

5. Automatic dual range scale means as defined in claim 1 further including counterweight means connected to said outboard end portions of said first and second weighing lever means.

6. Automatic dual range scale means as defined in claim 1, wherein said movement responsive means includes a member having a pair of openings therein, said first weighing lever means inboard end portion extending at least partially through one of said openings and said second weighing lever means inboard end portion extending at least partially through the other of said openings.

7. Automatic dual range scale means as defined in claim 1, wherein said coupling means includes a beam means having means thereon for attaching a load to be weighed, a first connector means extending from said beam means to said first weighing lever and a second connector means spaced from said first connector means and extending from said beam means to said second weighing lever means.

8. Automatic dual range scale means as defined in claim 7, wherein each of said connector means attaches to its respective weighing lever means between its fulcrum means and its inboard end portion.

9. Automatic dual range scale means as defined in claim 8 wherein each of said weighing lever means includes, at its inboard end portion, a contact means which is engageable with said movement responsive means.

10. Automatic dual range scale means as defined in claim 9, wherein said operational ranges of said scale means produce overall weighing ratios in accordance with the formula:

$$AX/BY$$

where A is the distance from the fulcrum means to the contact means along the weighing lever means engaged with the movement responsive means, where X is the distance along the beam means between said first and second connector means, where B is the distance from the fulcrum means to the connector means along the weighing lever means engaged with the movement responsive means, and where Y is the distance along the beam means from the load attaching means to the connector means coupled to the weighing lever means held out of engagement with said movement responsive means by said cam means.

11. Automatic dual range weighing scale means as defined in claim 7 wherein said load attaching means is offset along said beam means to be located closer to one of said connector means than to the other of said connector means.

12. Automatic dual range weighing scale means as defined in claim 1 wherein said movement responsive means includes a pair of spaced apart bearing members and wherein each of said weighing lever means includes, at its inboard end portion, a contact means, one of said contact means being engageable with one of said bearing members and the other of said contact means being engageable with the other of said bearing members.

References Cited by the Examiner

UNITED STATES PATENTS 1,369,102  2/1921  Hem _____ 177—156 X

References Cited by the Applicant

UNITED STATES PATENTS

| | | |
|---|---|---|
| Re. 21,169 | 8/1939 | McCrery. |
| 1,009,826 | 11/1911 | Brooke. |
| 1,392,827 | 10/1921 | Hem. |
| 1,829,026 | 10/1931 | Weir. |
| 2,130,821 | 9/1938 | Venable. |
| 2,193,594 | 3/1940 | Johnson. |
| 3,213,954 | 10/1965 | Meyer et al. |

RICHARD B. WILKINSON, *Primary Examiner.*

G. H. MILLER, *Assistant Examiner.*